United States Defensive Publication [19] (H) [11] T985,001

Reade et al. [43] Aug. 7, 1979

[54] COLORATION PROCESS

[75] Inventors: Grahame M. Reade, Wheathampstead; William Clarke, Middleton; Maurice Danby, Knutsford, all of England

[73] Assignee: Imperial Chemical Industries Limited, London, England

[21] Appl. No.: 958,997

[22] Filed: Nov. 9, 1978

[30] Foreign Application Priority Data

Nov. 11, 1977 [GB] United Kingdom ..... 47040/77

[51] Int. Cl.[2] ..... D06P 5/00

[52] U.S. Cl. ..... 8/2.5 R; 8/1 A; 8/21 C; 8/22; 8/25; 8/54; 8/54.2; 8/92; 106/22

[57] ABSTRACT

Water-impregnated textiles, especially of cellulose or wool, or mixtures of cellulose and wool with synthetic fibers and synthetic textiles, such as nylon and acrylics, particularly as assembled garments, are wet-transfer printed with a transferable printing design comprising a dyestuff which is reactive with the textile by heating the impregnated textile in contact with the design while maintained in a water-impervious enclosure comprising a polyester film or sheet, such as poly(ethylene terephthalate). The design is preferably applied to the polyester film or sheet which may be pretreated to facilitate coating with the transferable design. The pretreatment may comprise a wettable resin coating such as a cross-linked copolymer of acrylic acid, methacrylic acid or their glycidyl or lower alkyl esters.

Transfer printing materials useful in the wet-transfer printing process are also disclosed and include a supporting film or sheet of a synthetic thermoplastics linear polyester such as a film of biaxially oriented heat set poly(ethylene) terephthalate, and a transferable printing layer of a textile-reactive dyestuff applied to one or both surfaces of the film or sheet.

10 Claims, No Sheets Drawing,

18 Pages Specification

The file of this unexamined application may be inspected and copies thereof may be purchased (849 O.G. 1221, Apr. 9, 1968).